(12) United States Patent
Shen et al.

(10) Patent No.: US 6,745,656 B1
(45) Date of Patent: Jun. 8, 2004

(54) HIGH SPEED FLYING SHEAR

(75) Inventors: Xiaolan Shen, Boylston, MA (US); T. Michael Shore, Princeton, MA (US)

(73) Assignee: Morgan Construction Company, Worcester, MA (US)

( * ) Notice: Subject to any disclaimer, the term of this patent is extended or adjusted under 35 U.S.C. 154(b) by 617 days.

(21) Appl. No.: 09/288,450

(22) Filed: Apr. 8, 1999

(51) Int. Cl.$^7$ .............................. B26D 1/56; B23D 25/12
(52) U.S. Cl. ............................ 83/105; 83/106; 83/300; 83/345; 83/950
(58) Field of Search .................... 83/105, 106, 158, 83/159, 160, 162, 300, 303, 304, 305, 306, 165, 307, 308, 322, 345, 421, 439, 500, 503; 72/203, 226

(56) References Cited

U.S. PATENT DOCUMENTS

| | | | | |
|---|---|---|---|---|
| 2,401,639 A | * | 6/1946 | Hawthorne | 83/345 |
| 3,477,326 A | * | 11/1969 | Rainey | 83/345 |
| 4,062,259 A | | 12/1977 | Sclippa | |
| 4,202,230 A | * | 5/1980 | Obinata | 83/345 |
| 4,399,727 A | * | 8/1983 | Omori et al. | 83/345 |
| 4,406,198 A | | 9/1983 | Pechau et al. | |
| 5,040,440 A | * | 8/1991 | Harvey | 83/106 |
| 5,644,941 A | * | 7/1997 | Stodt et al. | 72/203 X |
| 5,857,370 A | | 1/1999 | Grenz et al. | |

FOREIGN PATENT DOCUMENTS

| | | |
|---|---|---|
| DE | DD145237 A | 12/1980 |
| DE | 3404688 A1 | 4/1985 |
| DE | 4119843 A1 | 12/1992 |
| EP | 0773082 A1 | 5/1980 |
| EP | 0 288 938 A2 | 4/1988 |
| EP | 0 297 313 B1 | 6/1988 |
| EP | 0 299 220 B1 | 6/1988 |
| EP | 0 618 033 A1 | 3/1994 |
| EP | 0 655 291 B1 | 10/1994 |
| EP | 0655291 A1 | 5/1995 |
| JP | 49-12234 | 3/1974 |
| JP | 52084587 | 7/1977 |
| JP | 56-82117 | 7/1981 |
| JP | 60067019 | 4/1985 |
| JP | 62199314 | 9/1987 |
| JP | 63047009 | 2/1988 |

* cited by examiner

Primary Examiner—Boyer D. Ashley
(74) Attorney, Agent, or Firm—Gauthier & Connors, LLP

(57) ABSTRACT

A flying shear has leader and follower blades rotating in opposite directions about parallel axes located above and below a horizontal plane. The radius of rotation of the leader blade is longer than the radius of rotation of the follower blade. The blades are configured and arranged to coact in a radially overlapping relationship at a cutting zone spaced vertically from the horizontal plane. A switch directs longitudinally moving products such as bars, rods and the like from the horizontal plane across the cutting zone for separation by the rotating blades into leading and trailing segments.

8 Claims, 8 Drawing Sheets

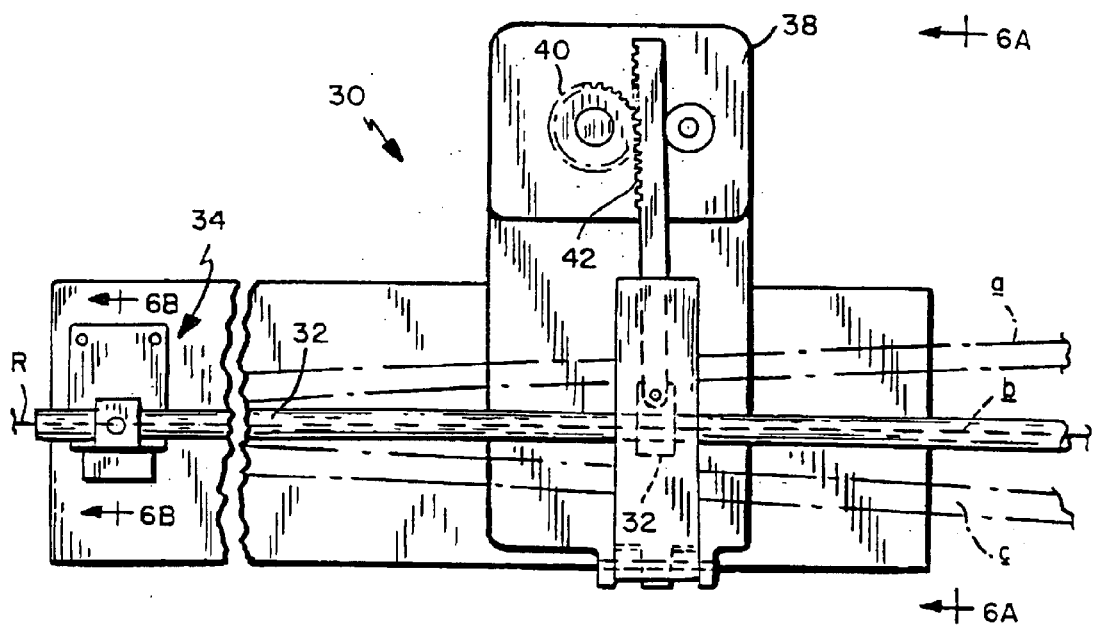
FIG. 5
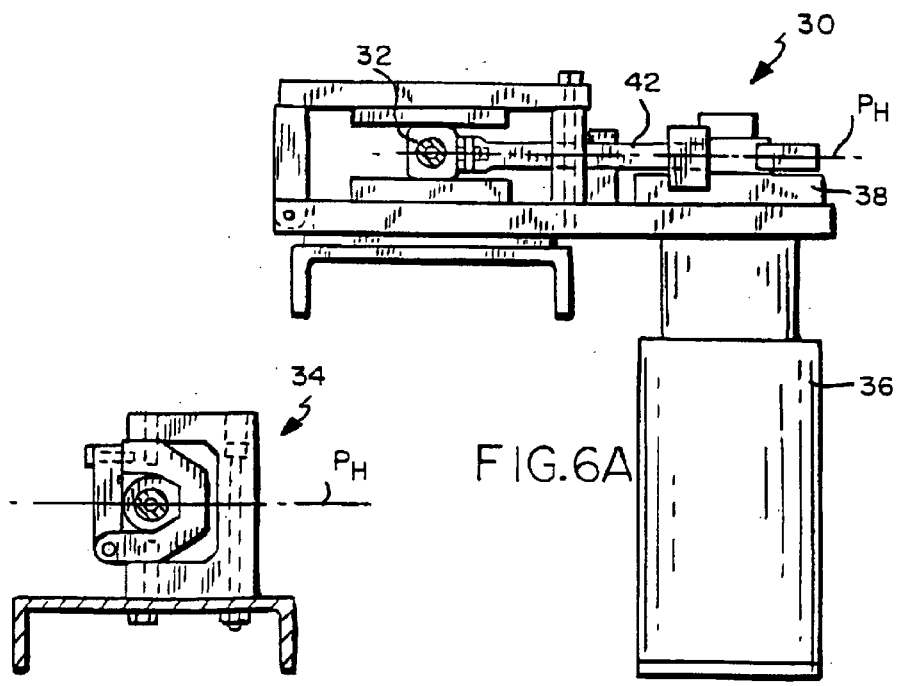
FIG. 6A
FIG. 6B

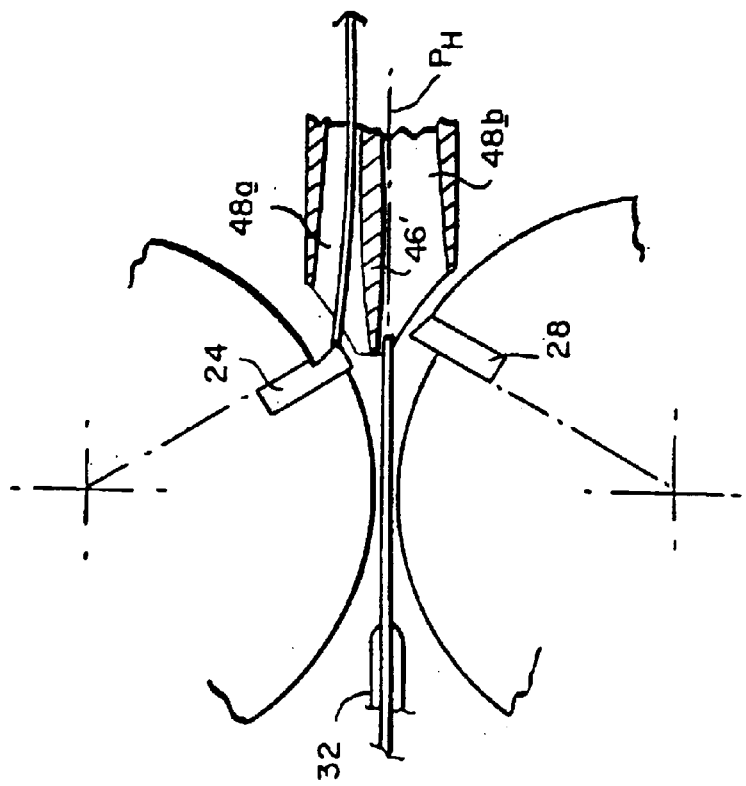
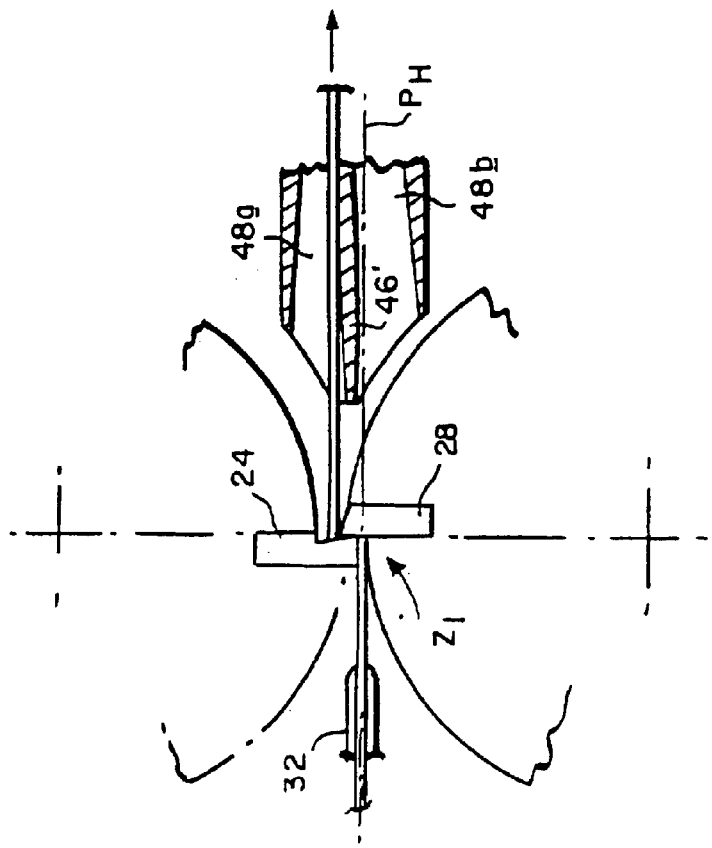
FIG.10D
FIG.10C

HIGH SPEED FLYING SHEAR

BACKGROUND OF THE INVENTION

1. Field of the Invention

This invention relates to flying shears for cropping the front and tail ends of hot rolled steel rods and other like products being delivered from a continuous high speed rolling mill.

2. Description of the Prior Art

Rods, bars, and other like long products produced by a continuous hot rolling process inevitably have off gauge front and tail ends that must be "cropped", i.e., severed and discarded. This can be accomplished by manual trimming after the products have left the rolling line. However, manual trimming requires the constant attention of mill personnel, and is both inefficient and expensive.

Preferably, therefore, cropping is effected by so-called "flying shears" designed to operate automatically on line at mill delivery speeds. Although flying shears have operated successfully in the past, improvements in their design have failed to keep pace with ever increasing mill delivery speeds, which in modern day high speed rod mills are now reaching 100–120 m/sec.

The objective of the present invention is the provision of an improved flying shear which is fully capable of operating reliably at all mill delivery speeds, including the highest delivery speeds of modern day rod mills.

SUMMARY OF THE INVENTION

A shear in accordance with one aspect of the present invention has leader and follower blades contrarotating continuously at equal angular velocities. The blades coact in a radially overlapping relationship at a cutting zone spaced vertically from the plane of product movement, with the leader blade preceding the follower blade, and with the radius of rotation of the leader blade being longer than that of the follower blade. A switch upstream of the cutting zone operates in one mode to direct a product along a path bypassing the cutting zone, and in a second mode to direct the product through the cutting zone for cutting by the contrarotating blades into leading and trailing segments. The blades are configured to deflect the tail end of the leading segment away from the plane of product movement while directing the front end of the trailing segment back to the plane of product movement.

In accordance with another aspect of the present invention, the shear is preferably provided with two sets of the aforesaid blades arranged in a side-by-side arrangement, one set being operable to crop a product front end, and the other set being operable to crop the product tail end.

In accordance with still another aspect of the present invention, the cropped ends and intermediate acceptable product lengths are received in the separate guide passageways of a stationary trough located downstream of the cutting zone. Chopping shears operate to subdivide the cropped ends into shorter scrap pieces.

These and other features and objectives of the present invention will now be described in great detail with reference to the accompanying drawings, wherein:

BRIEF DESCRIPTION OF THE DRAWINGS

FIG. 5 is an enlarged plan view of the switch assembly;

FIG. 6A is a view taken along line 6A—6A of FIG. 5;

FIG. 6B is a sectional view taken along line 6B—6B of FIG. 5;

FIGS. 10A–10D are schematic illustrations showing a typical cropping cycle; and

Figure 1:
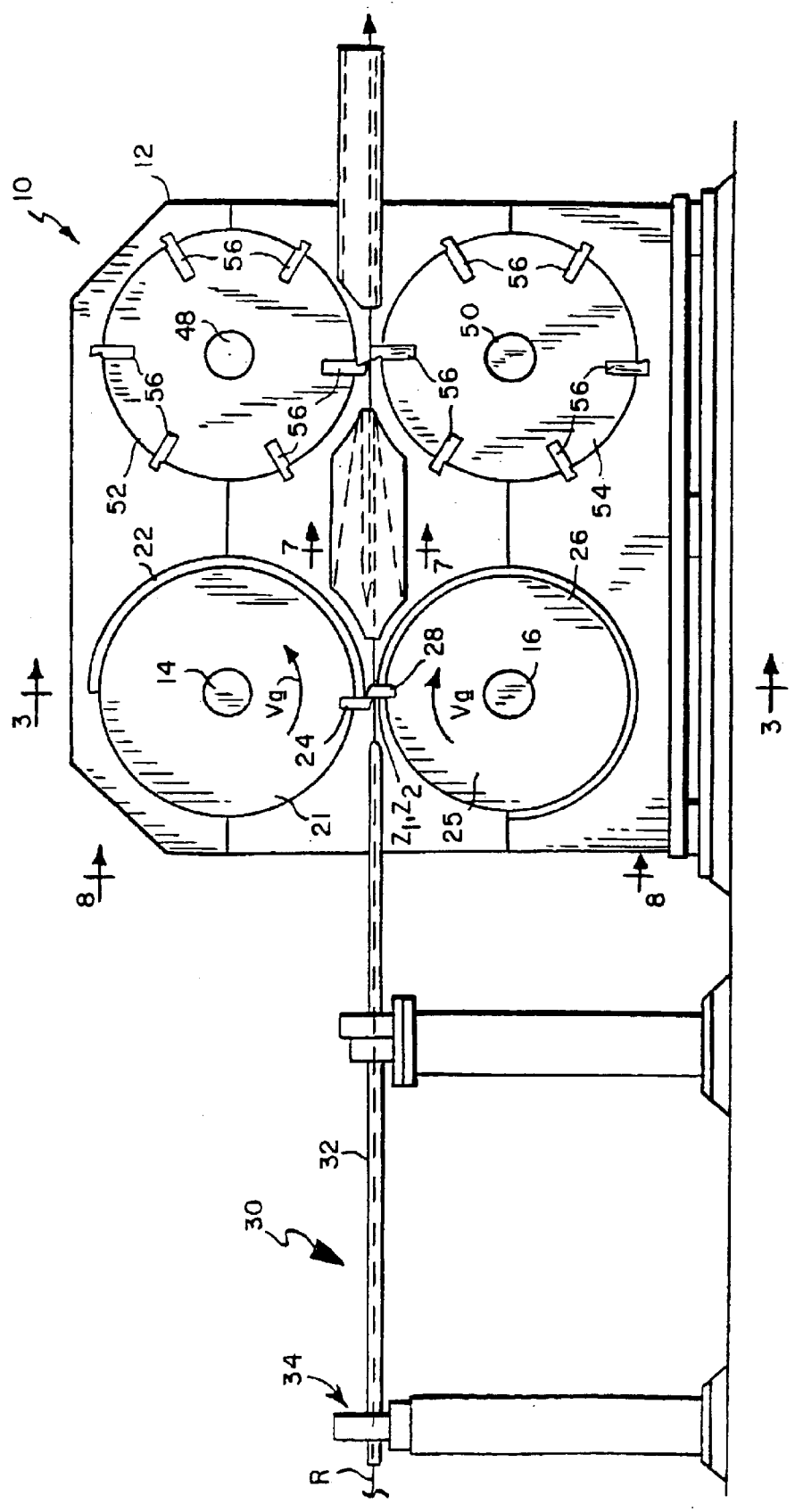
FIG. 1 is a view in side elevation of a shear in accordance with the present invention.
Figure 2:
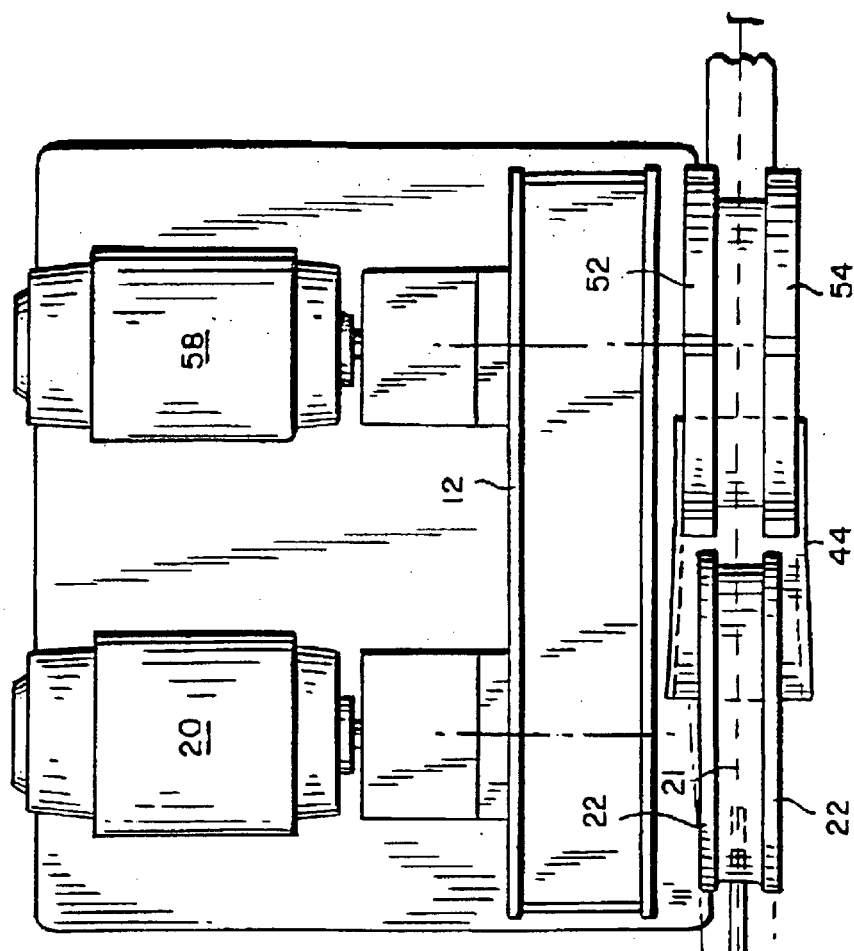
FIG. 2 is a top plan view of the shear.
Figure 3:
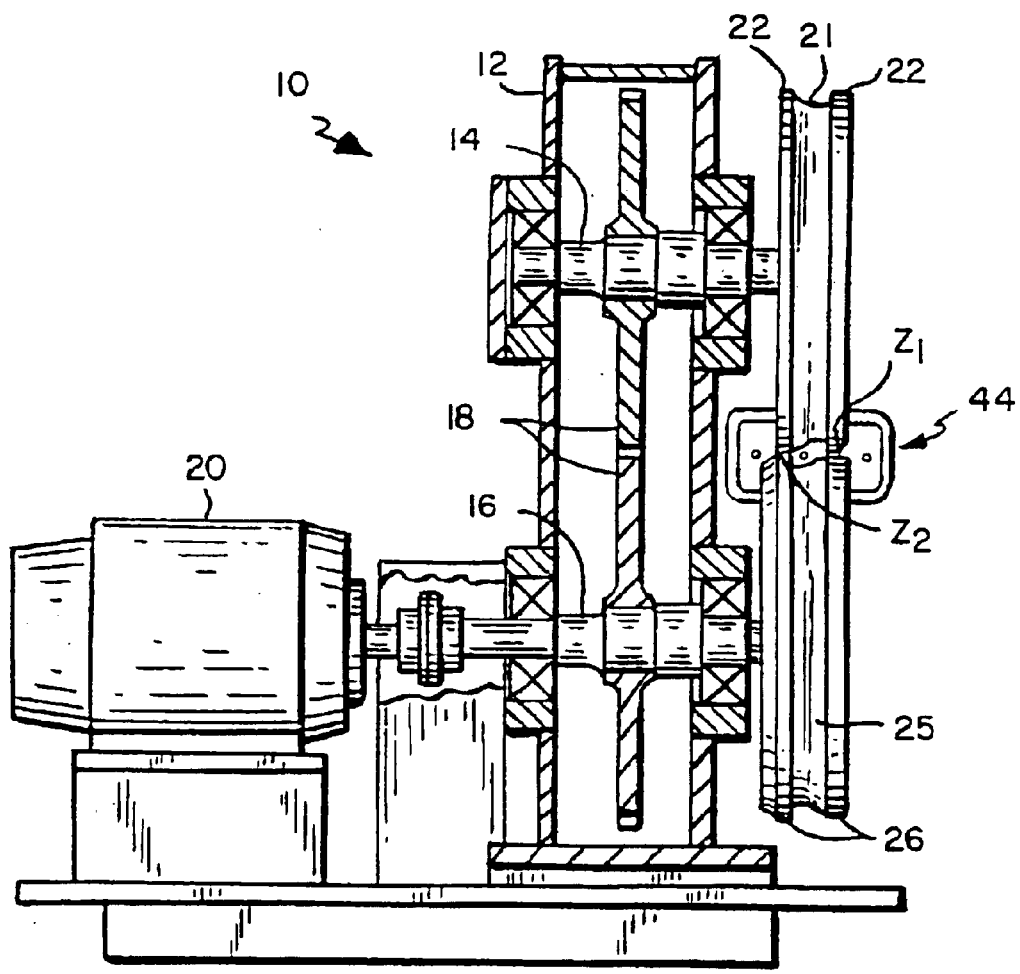
FIG. 3 is a sectional view taken along line 3—3 of FIG. 1.
Figure 8:
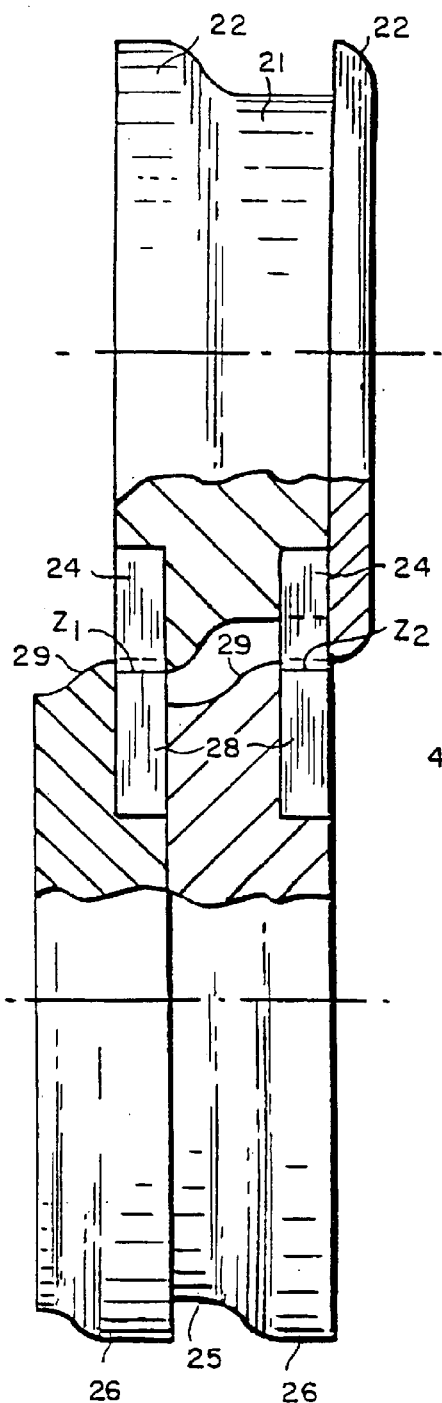
FIG. 8 is a view of the cropping discs and blades taken along lie 8—8 of FIG. 1.
Figure 9:
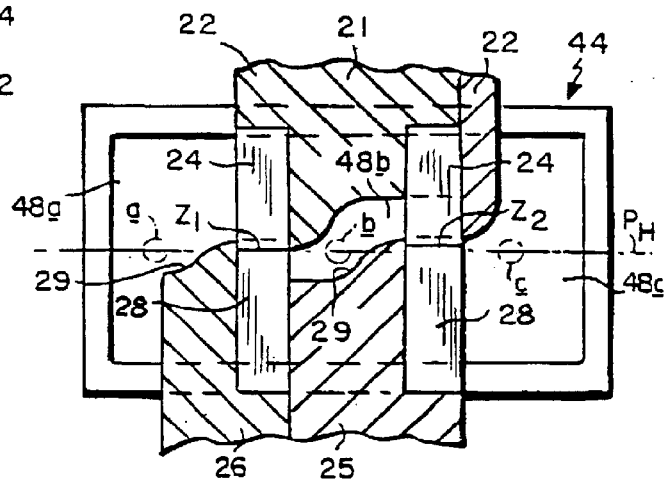
FIG. 9 is a partial view of the cropping discs and blades .with the stationary trough shown in the background.

Referring initially to FIGS. 1–3, a shear in accordance with the present invention is depicted generally at 10. The shear includes a stationary housing 12 rotatably supporting a parallel pair of upper and lower shafts 14, 16. The shafts are mechanically coupled by intermeshed gears 18, with the lower shaft 16 being driven continuously by a motor 20. An upper rotor 21 is mounted in cantilever fashion on the upper shaft 14. As can best be seen by additional reference to FIGS. 8 and 9, rotor 21 has axially spaced rims 22 each carrying an upper "follower" blade 24. A lower rotor 25 is similarly mounted in cantilever fashion on the lower shaft 16. Rotor 25 has axially spaced rims 26 each carrying a lower "leader" blade 28. As can best be seen when viewed from left to right in FIGS. 8, 9 and 11, the rims 26 are each laterally preceded by ramps 29 having gradually increasing diameters.

The shafts 14, 16 and their respective rotors 21, 25 and blades 24, 28 are contrarotated continuously by the motor 20 at equal angular velocities as shown by the arrows identified at $V_a$ in FIG. 1. The leader blades 28 precede the follower blades 24 in a radially overlapping relationship as they rotate through laterally spaced cutting zones $Z_1$, $Z_2$.

Figure 4:
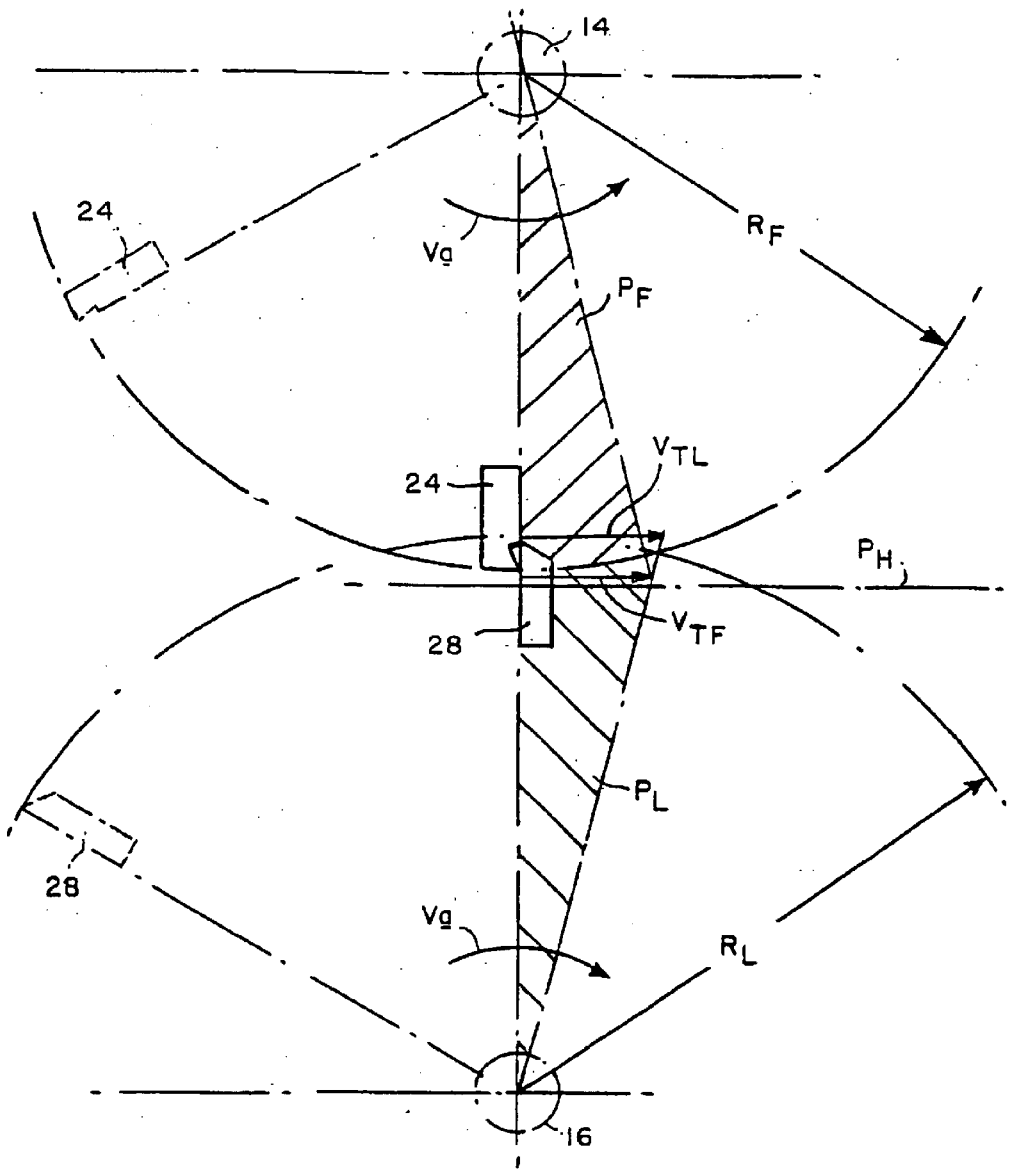
FIG. 4 is a diagrammatic illustration of the speed relationship between the leader and follower blades.

With reference to the diagrammatic depiction in FIG. 4, it will be understood that the radius of rotation $R_L$ of the leader blades 28 (measured from the axis of rotation of shaft 16 to the outermost tip of the blade) is longer than the radius of rotation $R_F$ of the follower blades 24. It follows, therefore, that for any given angular blade velocity $V_a$, the tangential tip velocity $V_{TL}$ of the leader blades 28 will exceed the tangential tip velocity $V_{TF}$ of the follower blades 24. Thus, as shown by the overlapping tangential velocity profiles $P_L$, $P_F$ of the leader and follower blades 28, 24, at each point in the area of radial blade overlap in the cutting zones, the tangential speed of the leader blades will exceed that of the follower blades. This speed differential allows for maximum blade overlap without attendant damaging interference between the coacting blades.

With reference additionally to FIGS. 6A and 6B, it will be seen that a switch 30 is located upstream of the cutting zones $Z_1$, $Z_2$. The switch includes a guide pipe 32 mounted as at 34 for pivotal movement in a horizontal plane $P_H$ in which the product to be cropped, e.g., hot rolled steel rod R, exits from the mill.

The pipe 32 may be pivoted by any appropriate mechanism, such as a servo motor 36 acting through a gear head 38 to rotate a drive gear 40. Gear 40 meshes with a rack 42 on an arm pivotally connected to and extending laterally from the pipe 32. As shown in FIG. 5, the pipe 32 is pivotally shiftable between positions indicated at "a", "b" and "c".

Figure 7:
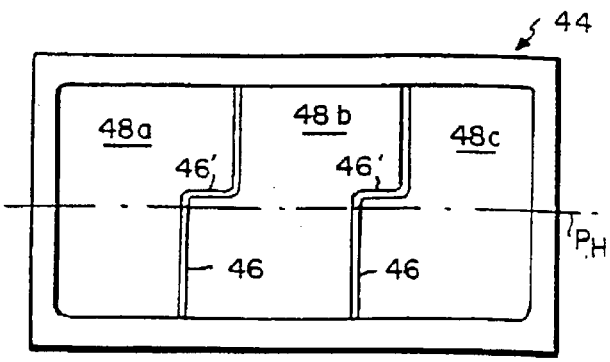
FIG. 7 is a sectional view on an enlarged scale taken along line 7—7 of FIG. 1.

A stationary guide trough 44 is arranged downstream of the cutting zones $Z_1$, $Z_2$. As can be best seen by additional reference to FIG. 7, the guide trough is internally divided by walls 46 into three passageways $48_a$, $48_b$, and $48_c$. The walls 46 each have a horizontal segment defining a ledge 46 positioned slightly above the horizontal plane $P_H$.

The housing 12 also rotatably supports additional upper and lower parallel shafts 48, 50 downstream of the stationary trough 44. The shafts 48, 50 are mechanically coupled by gears similar to those shown at 18 in FIG. 3, and carry side-by-side cantilevered discs 52, 54. These discs carry multiple chopping blades 56 designed to coact at cutting zones aligned with the passageways $48_a$, $48_c$ of the upstream trough 44. The chopping blades are contrarotated continuously by a drive motor 58 connected to the lower shaft 50.

Referring now to FIGS. 2, 9 and 10A–10D, the shear operates in the following manner:

Front End Crop

At the beginning of a front end cropping sequence, the guide pipe 32 of switch 30 is shifted to the position indicated at "a". This causes the off gauge front end of the product to bypass cutting zone $Z_1$, and to pass through guide passageway $48_a$ of trough 44 for subdivision by the chopping blades 56 on disc 52.

At the appropriate time, the switch pipe 32 is traversed from position "a" to position "b" thus directing the product across cutting zone $Z_1$ where it is subdivided into a leading segment which continues through guide passageways $48_a$ and a trailing section (in this case, the acceptable intermediate product length), which continues between the cutting zones $Z_1$, $Z_2$ and through guide passageway $48b$ between the cropping shear discs 52, 54 to other material handling equipment, typically a pinch roll unit preceding a laying head (not shown).

Figure 10B:
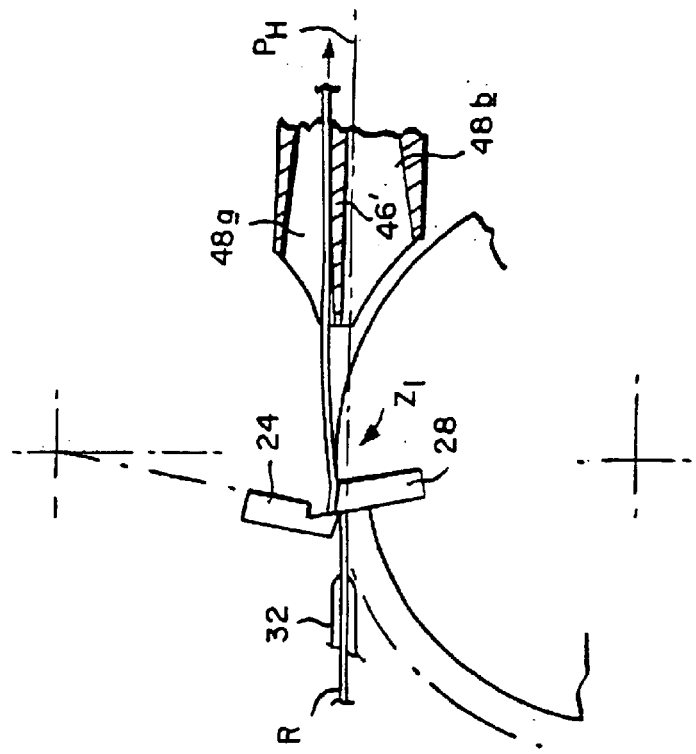
Figure 10A:
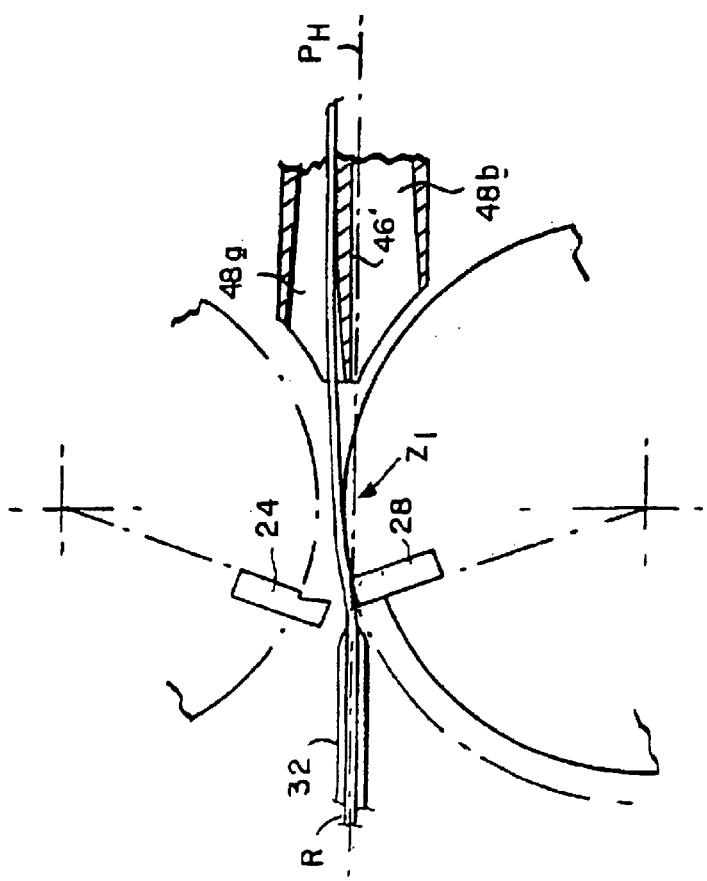

The cutting sequence is sequentially depicted diagrammatically in FIGS. 10A to 10D. FIG. 10A shows the blades 24, 28 approaching the cutting zone $Z_1$. The product front end passing through trough passageway 48a begins to traverse across the cutting zone $Z_1$ and while being lifted above plane $P_H$ as it rides up shoulder 29.

FIG. 10B shows the product severed into leading and trailing segments by the blades 24, 28. The leader blade 28 has preceded the follower blade 24 into the cutting zone and has begun to lift the tail end of the leading segment away from the front end of the trailing segment.

FIG. 10C shows the blades 24, 28 in their condition of maximum radial overlap in the cutting zone $Z_1$. The leader blade 28 continued to lift the tail end of the leading segment away from the plane $P_H$. The follower blade 24 now serves to redirect the front end of the trailing segment back to plane $P_H$ while it contacts and begins to exert a lifting action on the tail end of the leading segment.

In FIG. 10D, the blades 24, 28 are moving out of the cutting zone. The trailing blade 24 continues to lift the tail end of the leading segment away from the front end of the trailing segment. The leader blade 28 is now out of contact with the product, and the front end of the trailing segment has passed beneath the ledge 46' of the trough wall 46 into the central guide passageway 48b.

Tail End Crop

As the product tail end approaches the'shear, the guide pipe 32 of switch 30 will be shifted from position "b" to position "c". The product will be severed in cutting zone $Z_2$ in the manner described above, with the leading segment continuing on through guide passageway 48b, and with the trailing segment being directed into trough passageway 48c for subdivision by the chopping blades 56 on disc 54.

Figure 11:
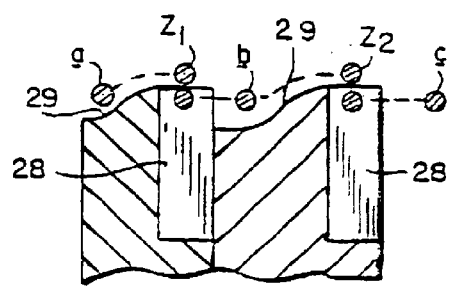
FIG. 11 is a schematic view showing the path of travel of the product as it is directed across the two cutting zones of the cropping shear.

The path of the product as it is directed through the successive cutting zones $Z_1$, $Z_2$ is diagrammatically shown in FIG. 11. Positions "a", "b" and "c" coincide with the same settings of the guide pipe 32. During the interval between billet lengths of product being rolled, the switch pipe 32 is returned to position "a" in readiness for the next front and tail end cropping sequence.

It will now be appreciated by those skilled in the art that the present invention provides a number of significant advantages not available with conventional prior art shears, To begin with, by rotating the leader blades 28 on a radius $R_L$ which is longer than the radius of rotation $R_F$ of the follower blades, for any given angular blade velocity $V_a$, the tangential speed $V_{TL}$ of the leader blades at any point of blade overlap will equal or preferably slightly exceed the tangential speed $V_{TF}$ of the follower blades. Thus, the extent of blade overlap in the cutting zone can be maximized without experiencing damaging contact between the blades. Maximizing blade overlap is important to effecting a clean cut of the product into leading and trailing segments.

The difference in rotational radii $R_F$, $R_L$ of the blades 24, 28 and the resulting maximum blade overlap is further beneficial in that during a cropping sequence, the tail end of the leading segment is lifted away from the front end of the trading segment, while allowing the front end of the trailing segment to continued in the horizontal plane $P_H$ beneath the downstream ledge 46' of the trough dividing wall. By lifting the tail end of the leading segment out of the path of the advancing front end of the trailing segment, troublesome contact between to two is avoided. This is accomplished with minimal deflection of the front end of the trailing segment, which is important to the avoidance of cobbles, particularly when cropping products moving at speeds on the order of 100/120 m/sec. and higher.

A further advantage stems from employing two sets of cutting blades in a side-by-side relationship to provide two cutting zones $Z_1$, $Z_2$, one for cropping front ends and the other for cropping tail ends. Since only one set of blades operates in each cutting zone, more time is available for effecting product traverse across each cutting zone.

Those skilled in the art will appreciate that various changes and modifications may be made to the above described shear without departing from applicant's inventive concepts. For example, other mechanically equivalent mechanisms may be employed to adjust the switch pipe to its different settings. The orientation of the follower and leader blades 24, 28 and the associated guide trough 44 can be turned 180°. Different blade designs may be employed. It is my intention to include these and all other equivalent changes and modifications within the scope of the appended claims.

We claim:

1. A shear for subdividing an elongated product moving longitudinally in a plane, said shear comprising:

leader and follower blades mounted on rotors for rotation about parallel axes located on opposite sides of said plane, said blades being arranged to coact in a radially overlapping relationship at a cutting zone located between said axes and spaced vertically from said plane, the radius of rotation of said leader blade being longer than the radius of rotation of said follower blade;

means for continuously rotating said blades at equal angular velocities, with said leader blade preceding said follower blade in said cutting zone; and switch means located upstream of said cutting zone, said switch means being operable in a first mode to direct said product along a path in said plane bypassing said cutting zone, and being operable in a second mode in concert with one of said rotors to deflect said product from said path and said plane into said cutting zone for cutting by said blades into leading and trailing segments, said blades being constructed and arranged to further deflect a tail end of said leading segment away from said plane while directing a front end of said trailing segment back to said plane.

2. The shear as claimed in claim 1 wherein said plane is substantially horizontal, and the rotational axes of said leader and follower blades said parallel axes are respectively located below and above said plane.

3. The shear as claimed in claim 2 further comprising a stationary receiving trough having first and second channels separated by an intermediate wall, said channels being positioned respectively to receive said leading and trailing segments.

4. The shear as claimed in claim 3 wherein said intermediate wall includes a horizontal ledge located above said horizontal plane.

5. A shear for subdividing an elongated product moving longitudinally in a horizontal plane, said shear comprising:

upper and lower continuously rotating blades carried on rotors and coacting in a radially overlapping relationship at a cutting zone located above said plane, the radius of rotation of said lower blade being longer than the radius of rotation of said upper blade;

a stationary receiving trough located downstream of said cutting zone, said receiving trough having first and second laterally disposed guide channels separated by an intermediate wall, said intermediate wall having a horizontal ledge located above said plane; and switch means located upstream of said cutting zone, said switch means being operable in a first mode to direct said product along a first path past said cutting zone into said first channel, and being operable in a second mode in concert with the rotor carrying said lower blade to deflect said product laterally from said first path and vertically from said plane into said cutting zone for cutting by said blades into leading and trailing segments, said blades being constructed and arranged to further deflect a tail end of said leading segment upwardly away from said plane while directing a front end of said trailing segment downwardly to said plane and beneath said ledge for continued movement along a second path through said second channel.

6. A shear for subdividing a product moving longitudinally along a path in a horizontal plane, said shear comprising: leader and follower blades carried on rotors and rotating in opposite directions about parallel axes located above and below said horizontal plane, the radius of rotation of said leader blade being longer than the radius of rotation of said follower blade, said blades being arranged to coact in a radially overlapping relationship at a cutting zone located laterally from said path and spaced vertically above said horizontal plane; and switch means coacting with one of said rotors to deflect said product laterally from said path and upwardly from said horizontal plane through said cutting zone for separation by said blades into leading and trailing segments, said blades being constructed and arranged to further deflect a tail end of said leading segment upwardly away from said horizontal plane while directing a leading end of said trailing segment downwardly into said horizontal plane.

7. A shear for subdividing an elongated product moving longitudinally in a horizontal plane, said shear comprising:

a pair of rotors mounted for rotation about parallel axes located on opposite sides of a cutting zone spaced vertically from said plane;

means for continuously rotating said rotors;

switch means located upstream of said cutting zone, said switch means being operable in a first mode to direct said product along a path and past said cutting zone, and being operable in a second mode in concert with one of said rotors to deflect said product laterally from said path and vertically from said plane into said cutting zone; and blade means on said rotors for cutting said product at said cutting zone into leading and trailing segments and for further deflecting a tail end of said leading segment away from said path while directing a front end of said trailing segment back to said plane.

8. The shear as claimed in claim 7, wherein said rotors are rotated at equal angular velocities, and wherein said blade means comprises leader and follower blades arranged to coact in a radially overlapping relationships at said cutting zone, with the radius of rotation of said leader blade being longer than the radius of rotation of said follower blade.

* * * * *